United States Patent [19]
Hahn

[11] Patent Number: 5,783,920
[45] Date of Patent: Jul. 21, 1998

[54] ERROR SIGNAL CONTROL CIRCUIT FOR A PHASE-LOCK-LOOP SENSORLESS MOTOR CONTROLLER

[75] Inventor: Dennis V. Hahn, Plano, Tex.

[73] Assignee: Texas Instruments Incorporated, Dallas, Tex.

[21] Appl. No.: 721,776

[22] Filed: Sep. 25, 1996

Related U.S. Application Data

[60] Provisional application No. 60/004,343 Sep. 26, 1995.
[51] Int. Cl.[6] .................................................. H02P 6/00
[52] U.S. Cl. ........................ 318/500; 318/459; 388/928.1
[58] Field of Search ............................... 318/459, 500, 318/138, 254, 439; 388/928.1

[56] References Cited

U.S. PATENT DOCUMENTS 4,658,194  4/1987  Richter et al. .................... 318/696
5,631,999  5/1997  Dinsmore .......................... 318/805

*Primary Examiner*—Bentsu Ro
*Attorney, Agent, or Firm*—Bret J. Petersen; W. James Brady, III; Richard L. Donaldson

[57] ABSTRACT

The present invention includes a circuit for detecting a back EMF signal for a motor. The circuit includes a circuit 200 for detecting when the back EMF signal from the motor is either a positive EMF signal or a negative EMF signal, a positive source circuit 302 to supply a positive current, a negative source circuit 304 to supply a negative current, a switch circuit 120 and 122 to connect the positive source circuit to an output circuit 410 of the back EMF signal circuit and to connect the negative source circuit to the output circuit, and the output circuit outputting the positive source current while the positive EMF signal is detected and outputting the negative current while the negative EMF signal is detected.

8 Claims, 3 Drawing Sheets

ERROR SIGNAL CONTROL CIRCUIT FOR A PHASE-LOCK-LOOP SENSORLESS MOTOR CONTROLLER

This application claims priority under 35 USC § 119(e)(1) of provisional application number 60/004,343, filed Sep. 26, 1995.

TECHNICAL FIELD OF THE INVENTION

The present invention relates to a DC permanent magnetic motor which may be a brushless type, including sensorless control.

BACKGROUND OF THE INVENTION

Brushless DC motors which are driven by rotors frequently include feedback controls for maintaining a desired phase angle relationship between the position of the rotor and the stator as each winding is energized. These windings may be energized so as to maintain the maximum amount of torque output from the motor at any given speed. In order to maintain this maximum amount of torque output, the windings must be energized when the rotor is in some predetermined position with respect to the stator windings. The windings should be energized when the rotor is in some predetermined position with respect to these stator windings.

The torque output from the motor is at a maximum when the stator current position, as determined by its driving invertor, is at an angle of 90° with respect to the magnetic flux position. The magnets are generally assumed to be mounted on the rotor which is directly connected to the output shafts. Thus, in order to maintain the torque at a maximum level, the current must be switched sequentially in step with the magnetic rotation of these magnets and at specific times. However, the maximum torque position at this phase angle is an unstable point. If a deviation from the 90° position occurs, the torque output declines without a restoring torque to regain alignment. Thus, some sort of feedback is required in order to maintain the torque at maximum.

Varying the invertor switching angle from the optimum position only results in reducing the torque; the motor's speed control must be performed in other ways which can increase and reduce the torque. Typically, stator voltage control may be used such as with a convention DC mechanical commutator motor.

Conventionally, DC motors employing the stator voltage control uses external sensors such as Hall effect sensors or inductors to measure the flux and provide a signal to the invertor to switch to the next phase in sequence as the flux reaches a predetermined threshold. However, the problem with employing external sensors is that with smaller motors, there is little or no space available for mounting the Hall effect sensors.

In switching the windings of these DC motors in sequence, there are times when at least one winding is completely unenergized. Systems have been proposed in which the back EMF across the unenergized windings is sensed in order to form a switching signal for the commutator. For example, Wright, U.S. Pat. No. 4,162,435 illustrates such a motor. The back EMF induced across the unenergized winding is sensed and this voltage is fed to an integrator. When the output of the integrator reaches a preset reference point, a signal is provided which enables the invertor to switch, energizing the next winding of the motor. The back EMF is sequentially sensed on all of the motor windings so that switching signals are provided for energizing each of the windings in turn. The problem with sensing the back EMF and energizing the next winding in this manner is that the switching signals for the inverter are entirely dependent upon sensing each back EMF of each energized windings. If one of these back EMF signals is missed, the control of the motor is lost and the motor is incapable of recovery.

U.S. Pat. No. 4,928,043 to Plunket discloses control using a voltage sensing network for sensing the back EMF on each motor winding when it is unenergized, and comparing this voltage with a null point. For maximum torque, this voltage has an optimum value, and any variation from this optimum value is used to produce an error signal which is integrated to produce a VCO drive signal. This VCO drive signal controls the frequency of a VCO which in turn controls the switching times of the inverter. This circuit has a problem in that the motor during start-up requires an excessively long period of time in order to reach the required operating speed. Furthermore, if the back EMF voltage is relatively small this results in a small output of the integrator which in turn increases the frequency at a slower rate. As a consequence the final operating speed of the motor is not reached until a long period of time.

SUMMARY OF THE INVENTION

The present invention provides a charge pump that provides a voltage which is input to a VCO. This voltage indicates the difference between each phase of the windings and the center tap voltage and an optimal phase. This voltage reaches the target voltage indicating the optimal or maximum torque achievable. The charge pump is operated independently of the magnitude of the back EMF voltage and reaches the largest voltage even if the back EMF voltage is small. The charge pump reaches the target voltage quickly and the present invention detects a high charge, reflecting overspeeding within one cycle of the back EMF voltage and as a consequence corrects this overspeeding condition within one cycle of the back EMF.

DETAILED DESCRIPTION OF THE INVENTION

Figure 1:
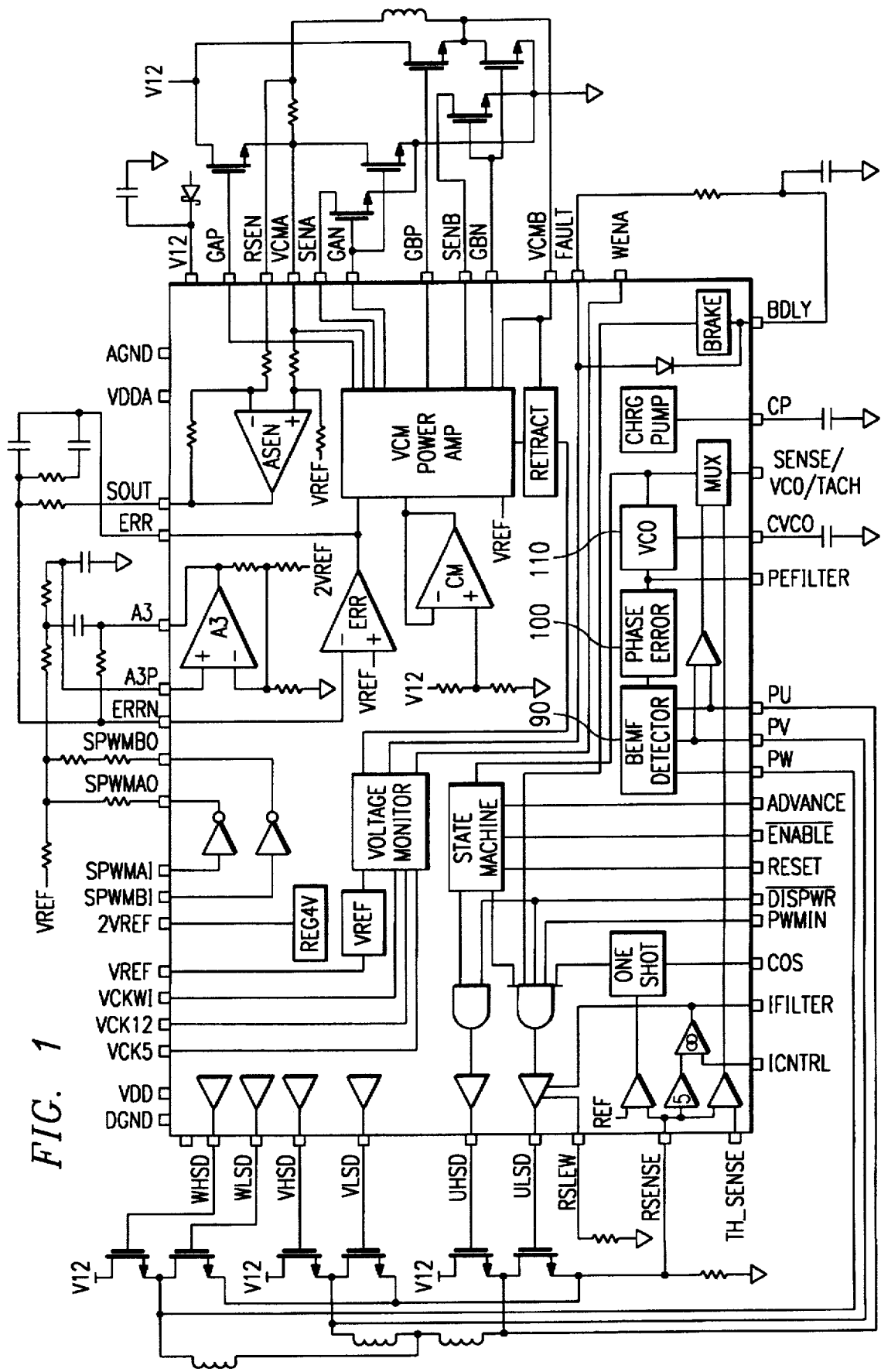
FIG. 1 illustrates the full servo controller device the present invention.

As illustrated in FIG. 1, the back EMF detector 90 is coupled to the individual coils of the motor. The back EMF detector 90 detects when an individual phase is not energized with respect to the center tap voltage of the motor.

Figure 4:
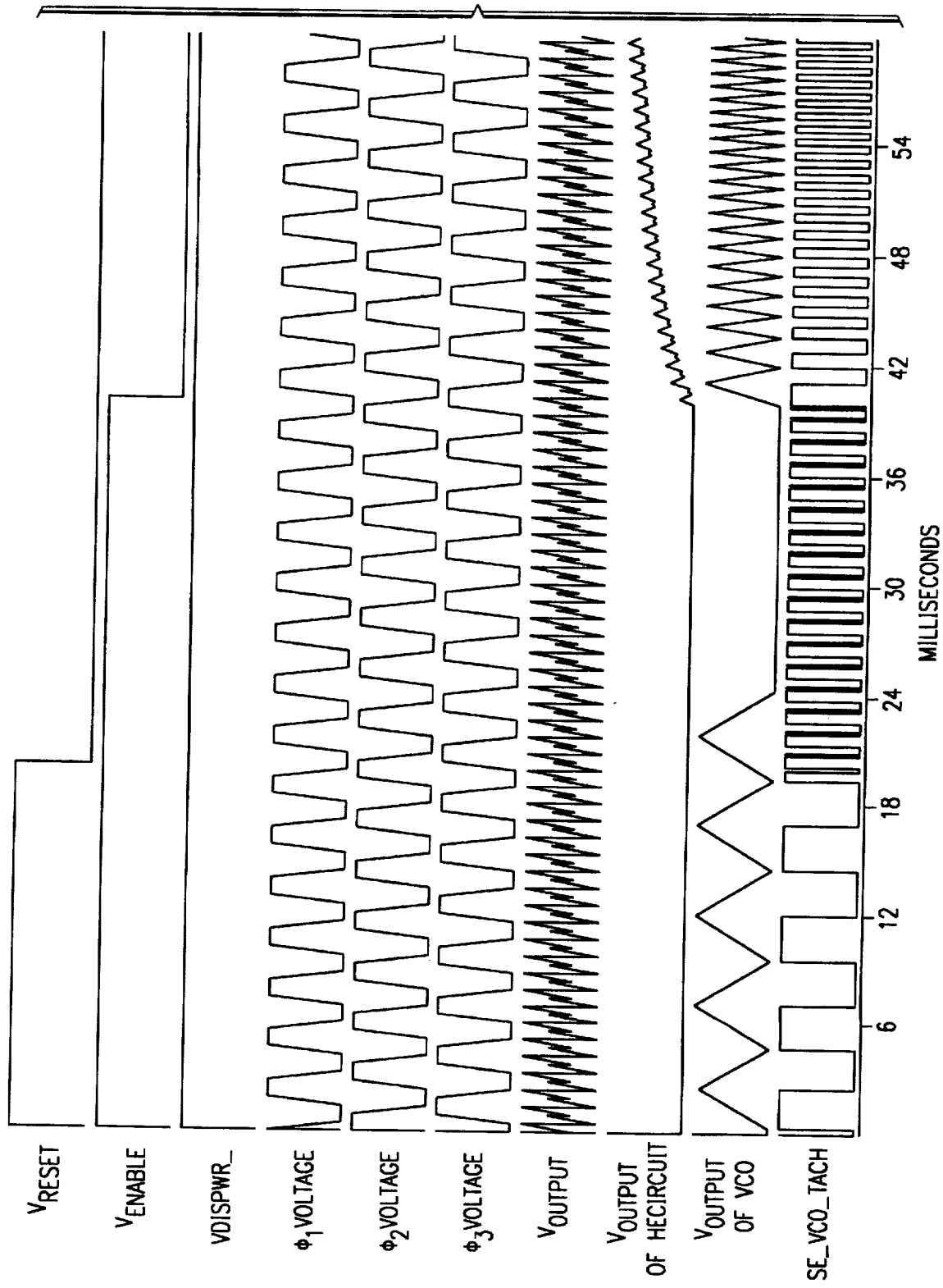
FIG. 4 illustrates waveform outputs of the present invention.

FIG. 4 illustrates the voltage output from the back EMF detector 90. This back EMF output voltage is input to the phase error circuit 100. The back EMF voltage varies in magnitude to reflect the magnitude of the difference between the phase voltage of the back EMF voltage and the center tap voltage. The back EMF voltage of the unenergized winding additionally varies positive and negative about the center tap voltage, reflecting the alternating polarity of the magnets in the rotor. FIG. 4 additionally illustrates the voltage output of the phase error circuit 100. When the voltage enable signal, which enables the phase error circuit 100, is received by the phase error circuit 100, the voltage output of the phase error circuit increases in accordance with the voltage output of the back EMF circuit 90.

The back EMF voltage is applied to nodes 402,404.

Figure 2:
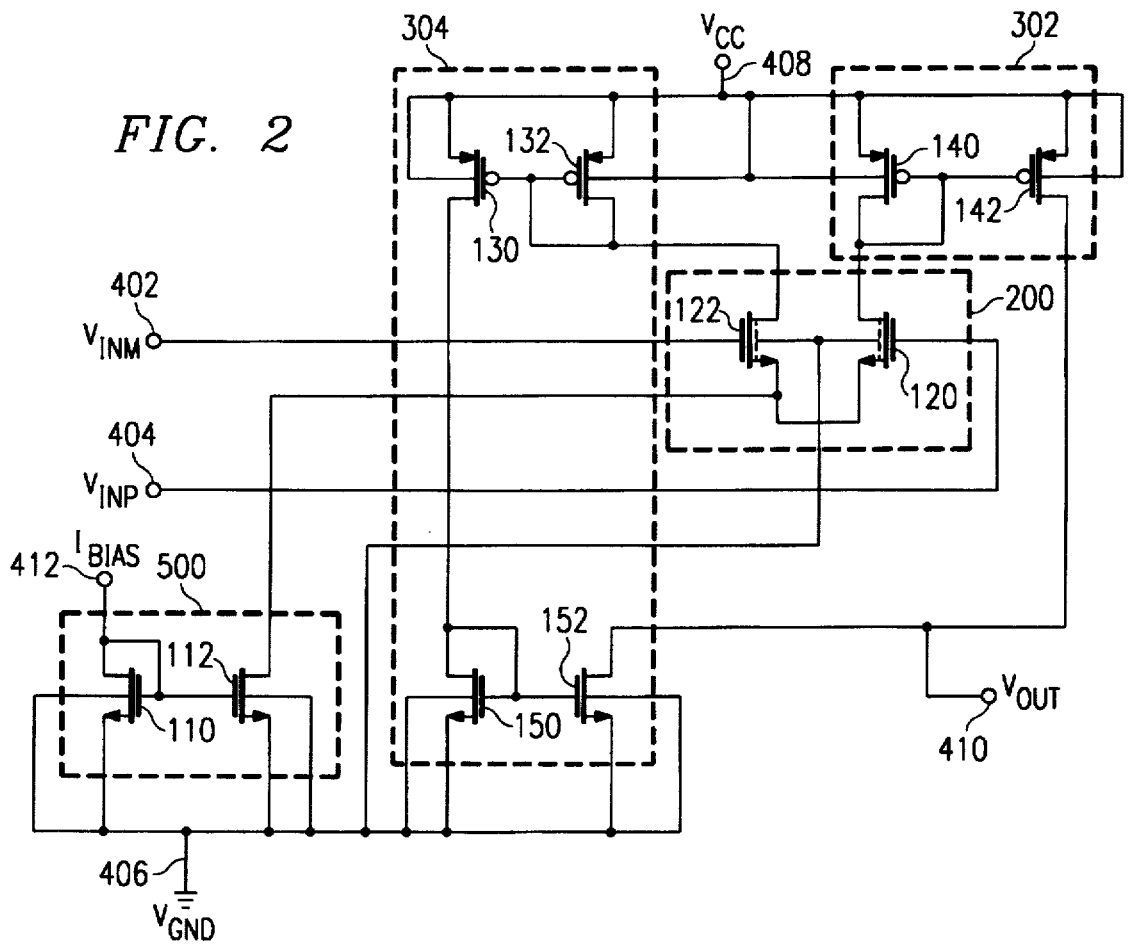
FIG. 2 illustrates a phase error circuit of the present invention.

More particularly, when the voltage at node 404 is greater than the voltage at node 402, the n channel transistor 120 is enabled or turned on. When the voltage at node 404 is less than the voltage at node 402, the n channel transistor 122 is enabled or turned on. As illustrated in FIG. 2. FIG. 2 illustrates a differential amplifier circuit 200 to drive a bias current from the mirror circuit 500. The mirror circuit 500 serves as a current source to the differential amplifier circuit 200. The output from the differential amplifier circuit 200 is input to the charge pump circuits 302 and 304 which provides either a positive current to VCO or a negative or discharge current to/from VCO. The charge pump circuit 300 includes two mirroring circuits 302 and 304. One of the mirroring circuits positive mirror circuit 302 is controlled to provide a positive current as the back EMF voltage is positive with respect to the center tap voltage and another mirroring circuit, negative mirror circuit 304, produces a negative current while the back EMF voltage is negative with respect to the center tap voltage. The control of the mirroring circuits (302 and 304) are by the differential amplifier circuit 200.

The differential amplifier circuit 200 includes an n channel transistor 120 and n channel transistor 122. The gate of transistor 120 is coupled to the node 404 while the source of transistor 120 is coupled to the source of n channel transistor 122 and to n channel transistor 112. The backgates of transistors 122 and 120 are coupled together. The drain of transistor 120 is coupled to the drain of P channel transistor 140 while the drain of transistor 122 is coupled to the drain of P channel transistor 132. The positive back EMF voltage controls transistor 120 by turning transistor 120 on so that current from transistor 112 flows through the drain and source of transistor 120 and transistor 140. In a similar fashion, the negative back EMF voltage controls transistor 122 by turning transistor 122 on, which supplies current to alternate legs of the differential amplifier circuit 200, such that the current from transistor 112 flows through the source and drain of transistor 122 and through the source and drain of transistor 132.

The mirror circuit 500, includes n channel transistor 112 and n channel transistor 110. The source of transistor 112 is connected to node 406 which is connected to a reference voltage example ground. The backgate of transistor 112 is connected to the backgate of transistor 110, which are both connected to the reference voltage example ground. The gate of transistor 112 and 110 are connected together and connected to node 412. The node 412 is connected to a current source so that for example a current of 50 microamps flows to the gate and drain connection of transistor 110. The mirror circuit 500 provides a source of current for the charge pump circuits 302 and 304. The output current of mirror circuit 500 is controlled by the differential amplifier circuit 200. The sources of transistors 132 and 140 are connected to node 408, and the voltage of 408 may be at voltage Vcc. Additionally, the backgates of transistors 132 and 140 are coupled to node 408. A positive mirror circuit 302 includes P channel transistor 140 and P channel transistor 142. A first negative mirror circuit includes P channel transistor 130 and P channel transistor 132. The source of transistor 120 is coupled to the gate of transistor 140 and transistor 142. Transistor 142 is connected to node 408 at the source and backgate of transistor 142 while the drain of transistor 142 is connected to the output node 410. Transistor 120 is turned on by a positive voltage for example greater than 2 volt back EMF voltage. Since transistor 120 is turned on, it connects the current supplied by transistor 112 to the drain and gate connection of transistor 140. The current in transistor 140 is mirrored to transistor 142 due to the common gate connection, and the current in transistor 142 can flow to node 410. The current that flows through transistor 140, transistor 120 and transistor 112 is mirrored to transistor 142 which is connected to the output node 410.

Additionally, the source of transistor 130 is coupled to node 408 while the gate of transistor 130 is coupled to the gate of transistor 132 and to the source of transistor 122. The backgate of transistor 130 is coupled to node 408 while the drain of transistor 130 is coupled to a second negative mirror circuit. When a positive voltage is applied to node 402, with respect to the voltage at node 404, transistor 122 is turned on and conducts between the source and drain. A current path is established with transistor 112 and transistor 122. This controls transistors 130 and 132 to turn on and to conduct so that the current flows between the source and drain of transistor 132 through the drain and source of transistor 122 and through the source and drain of transistor 112. This current is mirrored to transistor 130 to flow between the source and drain.

The second negative mirror circuit includes n channel transistors 150 and n channel transistor 152. The drain of transistor 152 is coupled to the drain of transistor 142. The drain of transistor 130 is coupled to both the gates of transistor 150 and 152. The backgate and source of transistors 150 and 152 is coupled to node 406. When transistor 130 is conducting the current flowing between the source and drain of transistor 130 flows through the drain and source of transistor 150. The current flowing through the drain and source of transistor 150 is mirrored to transistor 152 so that current flows from node 410 to node 406 through transistor 152. Since transistor 120 is turned off, transistor 142 is turned off preventing current from flowing through its source and drain.

In operation as a positive back EMF voltage is detected from the coil PU, PV or PW of the motor, the undriven phase is compared to the center tap. When the voltage is less than a predetermined voltage, for example two volts, current flows through the drain of transistor 122 through transistor 112 and through transistor 132. As a result of the mirror action of the first negative mirror circuit, transistor 130 conducts essentially the same current from the source to the drain of transistor 132. The current flows through transistor 150. The second negative mirroring circuit mirrors the current through transistor 150 to transistor 152 from the output node 410. In a similar fashion, when the input voltage is greater than a predetermined voltage, for example 2 volts, the transistor 120 is turned on, providing a current path through the source to drain of transistor 140 through the source to drain of transistor 120 and through the drain to source of transistor 112. As a result of the mirroring action the same current flows through the source to drain of transistor 140 flows through transistor 142 to the output node 410. Thus, as the back EMF voltage alternates between the positive and negative voltage, a charge and discharge current is established.

Thus, the circuit provides a charge current as long as the back EMF voltage is positive and a discharge current as long as the back EMF voltage is negative, the net effect of the charging and discharging is based on the period of time of a positive back EMF voltage with respect to the amount of time for the negative back EMF. As illustrated in FIG. 4, since the positive back EMF voltage exceeded the period of time for the negative back EMF a net charge is obtained from the charge pump circuit. However, this charging is reduced by the negative back EMF once the target voltage is surpassed, the next negative back EMF voltage signal reduces the charge sufficiently so the target voltage is not exceeded and the motor does not overspeed.

Figure 3:
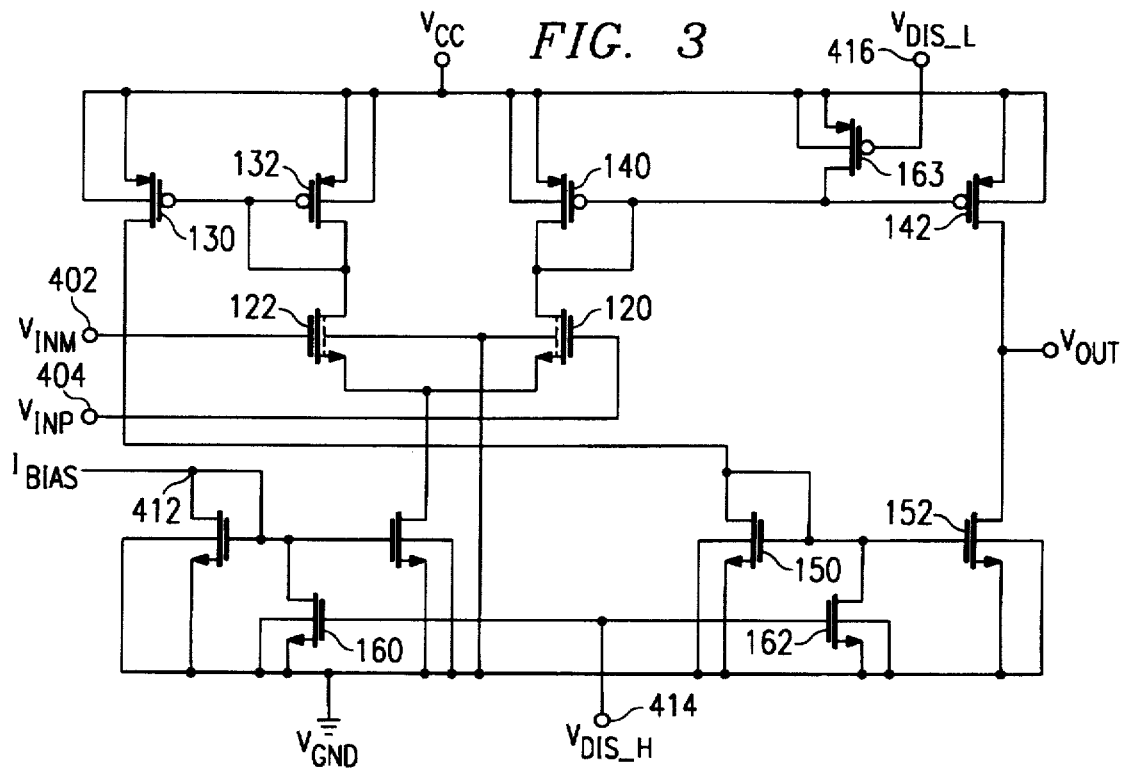
FIG. 3 illustrates another phase error circuit of the present invention.

FIG. 3 illustrates two disable circuits to disable the positive current and a second disable circuit to disable the negative current. The disable circuit to disable the positive mirror circuit 302 includes the P channel transistor 163 coupled to the gate of transistors 142 and 140 at the drain of transistor 163 while the source and backgate of transistor 163 is coupled to node 416. The gate of transistor 163 is coupled to node 416 where a disabled low voltage is input. In operation, if a disable negative signal is applied to node 416, the transistor 163 is turned on, bringing the gates of transistors 140 and 142 to the voltage node 408, for example VCC. Since this voltage is high with respect to ground, transistors 140 and 142 are turned off. Effectively, disabling the positive charge pump.

The negative disable circuit includes n channel transistors 160 and 162. The drain of transistor 160 is coupled to the gate of transistors 110 and 112. The source and backgate of transistor 160 is coupled to node 406. The drain of transistor 162 is coupled to the gate of transistors 150 and 152. As a disable positive signal is applied to node 414, transistors 160 and 162 are turned on and the gates of transistors 110, 112, 150 and 152 are effectively at ground which turns off transistors 110, 112, 150 and 152, disabling the negative charge pump circuit. Thus, enable and disable control of charge pump may be achieved.

I claim:

1. A circuit for detecting a back EMF signal for a motor, comprising:

a detecting circuit for detecting when the back EMF signal from the motor is either a positive EMF signal or a negative EMF signal;

a positive source circuit to supply a positive source current;

a negative source circuit to supply a negative source current;

a switch circuit to connect said positive source circuit to an output circuit of the detecting circuit and to connect the negative source circuit to the output circuit;

said output circuit outputting said positive source current while said positive EMF signal is detected and outputting said negative source current while said negative EMF signal is detected.

2. A circuit for detecting a back EMF signal for a motor as in claim 1, wherein said detecting circuit includes a differential circuit for detecting the back EMF signal.

3. A circuit for detecting a back EMF signal for a motor as in claim 1, wherein said positive source circuit is a mirror circuit.

4. A circuit for detecting a back EMF signal for a motor as in claim 1, wherein said negative source circuit is a mirror circuit.

5. A method for detecting a back EMF signal for a motor, comprising the steps of:

detecting a positive EMF signal or a negative EMF signal from the back EMF signal of the motor;

supplying a positive current;

supplying a negative current;

connecting said positive current to an output node and connecting said negative current to the output node;

outputting said positive current from said output node while said positive EMF signal is detected and outputting the negative current while said negative EMF signal is detected.

6. A method for detecting a back EMF signal for a motor as in claim 5, wherein said detecting step includes the step of detecting the back EMF signal with a differential circuit.

7. A method for detecting a back EMF signal for a motor as in claim 5, wherein said step of supplying the positive current includes the step of producing the positive current with a mirror circuit.

8. A method for detecting a back EMF signal for a motor as in claim 5, wherein the step of supplying the negative current includes the step of producing the negative current with a mirror circuit.

* * * * *